(12) United States Patent
Karakoussis et al.

(10) Patent No.: US 12,729,165 B2
(45) Date of Patent: Sep. 8, 2026

(54) FOAMED LIQUEFIERS IN GYPSUM BOARDS

(71) Applicant: Knauf Gips KG, Iphofen (DE)

(72) Inventors: Stergios Karakoussis, Laubach (DE); Georgi Paraskov, Neustadt an der Aisch (DE); Alexander Hartmann, Kleinlangheim (DE); Anton Peter, Wuerzburg (DE)

(73) Assignee: Knauf Gips KG, Iphofen (DE)

(*) Notice: Subject to any disclaimer, the term of this patent is extended or adjusted under 35 U.S.C. 154(b) by 732 days.

(21) Appl. No.: 17/779,685

(22) PCT Filed: Nov. 27, 2019

(86) PCT No.: PCT/EP2019/000321
§ 371 (c)(1),
(2) Date: May 25, 2022

(87) PCT Pub. No.: WO2021/104602
PCT Pub. Date: Jun. 3, 2021

(65) Prior Publication Data
US 2023/0002287 A1 Jan. 5, 2023

(51) Int. Cl.
*C04B 38/10* (2006.01)
*C04B 24/20* (2006.01)
(Continued)

(52) U.S. Cl.
CPC .............. *C04B 38/10* (2013.01); *C04B 24/20* (2013.01); *C04B 28/14* (2013.01);
(Continued)

(58) Field of Classification Search
CPC .......................... C04B 40/0046; C04B 38/106
See application file for complete search history.

(56) References Cited

U.S. PATENT DOCUMENTS 4,126,599 A 11/1978 Sugahara et al.
5,643,510 A * 7/1997 Sucech ................. C09K 23/00 156/43

(Continued)

FOREIGN PATENT DOCUMENTS

EP 1637302 B1 7/2011
WO 2019024971 A1 2/2019

OTHER PUBLICATIONS

Diloflo CA Polynaphthalene Sulfonate, Calcium Salt Zero Free Formaldehyde Dispersant, Product Bulletin, Geo Specialty Chemicals, 2013.

*Primary Examiner* — Virak Nguon
(74) *Attorney, Agent, or Firm* — The Webb Law Firm

(57) ABSTRACT

The invention concerns a method for producing gypsum boards, wherein a liquefier for the gypsum slurry is foamed with gas to provide a foam having a water content of less than 85 wt.-%, then incorporated into a gypsum/water mixture and the mixture thus obtained is applied on a two dimensional substrate. The incorporation of the liquefier in foamed form allows for a significant reduction of the amount of liquefier required to provide a desired flowability of the gypsum/water mixture, thus allowing the production of gypsum boards with similar characteristics with less liquefier. The invention further concerns gypsum board prepared using this process, apparatuses for producing gypsum boards using this process and the use of a corresponding liquefier foam to minimize the amount of liquefier required to establish a desired flowability of a gypsum/water mixture.

19 Claims, 1 Drawing Sheet

(51) Int. Cl.

| | |
|---|---|
| ***C04B 28/14*** | (2006.01) |
| ***C04B 40/00*** | (2006.01) |
| ***C04B 103/10*** | (2006.01) |
| ***C04B 103/30*** | (2006.01) |
| ***C04B 103/40*** | (2006.01) |
| ***C04B 111/00*** | (2006.01) |

(52) U.S. Cl.

CPC ...... *C04B 40/0046* (2013.01); *C04B 2103/10* (2013.01); *C04B 2103/30* (2013.01); *C04B 2103/40* (2013.01); *C04B 2111/0062* (2013.01)

(56) References Cited

U.S. PATENT DOCUMENTS

| | | | | |
|---|---|---|---|---|
| 5,683,635 | A | 11/1997 | Sucech et al. | |
| 6,632,550 | B1 | 10/2003 | Yu et al. | |
| 2006/0278128 | A1* | 12/2006 | Liu ......................... | C04B 28/14 106/781 |
| 2006/0278132 | A1 | 12/2006 | Yu et al. | |
| 2007/0298235 | A1* | 12/2007 | Yoshida ................. | D21H 13/40 428/294.7 |
| 2012/0172468 | A1* | 7/2012 | Blackburn .............. | C04B 28/14 521/83 |
| 2016/0229748 | A1* | 8/2016 | Gehrig .................... | C04B 24/30 |
| 2017/0036962 | A1* | 2/2017 | von der Schulenburg-Wolfsburg .............. | C04B 38/10 |
| 2018/0030729 | A1 | 2/2018 | Aldabaibeh et al. | |
| 2019/0054656 | A1* | 2/2019 | Hirooka .............. | B28B 19/0092 |

* cited by examiner

FOAMED LIQUEFIERS IN GYPSUM BOARDS

CROSS-REFERENCE TO RELATED APPLICATION

This application is the United States national phase of International Application No. PCT/EP2019/000321 filed Nov. 27, 2019, the disclosure of which is hereby incorporated by reference in its entirety.

BACKGROUND OF THE INVENTION

Field of the Invention

The invention concerns a method for producing gypsum boards, wherein a liquefier for the gypsum slurry is foamed with a gas to provide a foam, the liquefier having a water content of less than 85 wt.-%, then incorporated into a gypsum/water mixture and the mixture thus obtained is applied on a two dimensional substrate. The invention further concerns gypsum boards prepared using this process, apparatuses for producing a gypsum board using this process and the use of a corresponding liquefier foam to minimize the amount of liquefier required to establish a desired flowability of a gypsum/water mixture.

Description of Related Art

Methods for the production of gypsum products, in particular gypsum boards are well-known. Regularly such methods involve the mixing of calcium hemihydrate (also designated as “stucco”), water and other additives as desired to provide a flowable mixture, which is then poured on a substrate, often made from paper or a nonwoven, and dried. To provide the gypsum mixture with the required flowability that it can be evenly spread out on the substrate, and form an even and uniform surface, often liquefiers or dispersants are added to the gypsum mixture. Such liquefiers are e.g. materials such as naphthalene sulfonates or polycarboxylate dispersants, the latter of which are more commonly used with cements as “superplasticizers”.

The addition of liquefiers, in addition to improving the flowability of the gypsum mass, has been found to also affect the size distribution of foam bubbles and the voids created by these bubbles when the gypsum board is dried. In addition, the liquefiers can retard the set of the gypsum slurry, thus complicating the manufacture of gypsum products at high production speeds. For example, if a higher amount of liquefier is added, this may increase the set time. If a wallboard is not sufficiently set when the materials passes the cutting knife of the production machinery, the product may not holds its shape on cutting and may be damaged by handling of the board after it is cut. Thus, it may be necessary to reduce the speed of the production line to allow for sufficient hardening of the material.

In addition, the liquefier is also a cost factor for the production process. However, omitting the liquefier is not a commercially feasible option as the savings by not having to use a liquefier are overcompensated by the necessity to provide sufficient flowability by adding more water into the gypsum mixture. This leads to increased effort and cost for drying the boards produced. Thus, there is a general aim at providing compositions for the preparation of gypsum board which include a liquefier to provide sufficient flowability to the gypsum slurry, while keeping the amount of liquefier at a low level to maintain the desired physical and drying characteristics of gypsum boards prepared therefrom with an as high as possible production speed.

A method to use an aqueous foam and dispersants together to obtain a gypsum board, which is strong and lightweight, has been described in US 2006/0278128 A1. In this application, a minor part of the dispersant is mixed with soap and water to generate a foam to provide voids in the final board product. The major part of the dispersant is mixed with water, which is then combined with stucco to prepare the gypsum/water slurry. Prior to casting the gypsum board, the foam and slurry are combined. In the soap foam of US 2006/0278128 A1 the liquefier and soap account for about 3 wt.-% and 1 wt.-% of the foam, respectively.

SUMMARY OF THE INVENTION

In the investigations underlying this invention, it has now unexpectedly been found that the introduction of a foamed liquefier into the gypsum slurry provides for a higher flowability of the slurry compared to a slurry prepared with the same amount of non-foamed liquefier. In addition, it has been observed that the effect is particularly pronounced when the liquefier is foamed in the presence of low amounts of water, i.e. e.g. if the foamed liquefier is foamed from a technical grade liquefier starting material such as from liquefier having a water content of about 40 to 80 wt.-%. Such liquefiers, when foamed e.g. with a mixer, provide stable foams, which can conveniently be incorporated into gypsum/water mixtures either as an additive to the make water to prepare a gypsum slurry, to the dry ingredients of the gypsum board prior to mixture with the water or to the gypsum slurry after the mixer and prior to casting the gypsum board.

Thus, in a first aspect, the invention concerns a method for producing a gypsum board, characterized in that a liquefier for the gypsum slurry is foamed with a gas to provide a foam having a water content of less than 85 wt.-%, then incorporated into a gypsum/water mixture and the mixture thus obtained is applied on a two dimensional substrate.

The term “gypsum/water mixture” in the context of the application is used interchangeably with “gypsum/water slurry”.

The calcium sulfate hemihydrate or stucco in the above gypsum/water mixture, also known as calcined gypsum, is present in amounts of at least 50% of the dry materials used for the production of the gypsum board. Preferably, the amount of gypsum is at least 80%. In many wallboard formulations, the dry component material is more than 90% or even 95% calcium sulfate hemihydrate. The method of calcination is not important, and either alpha or beta-calcined stucco is suitable. Use of calcium sulfate anhydrite is also contemplated, although it is preferably used in small amounts of less than 20%.

Water used to make the slurry should be as pure as practical for best control of the properties of both the slurry and the set composition. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

The amount of water in the gypsum/water mixture is regularly such as to provide sufficient flowability to the mixture. The amount of water to be used varies greatly according to the application with which it is being used, the exact liquefier being used, the properties of the stucco and the additives being used. The water to stucco ratio ("WSR") for wallboard is preferably about 0.1 to about 0.8 based on the dry weight of the stucco. Commonly, a WSR of about 0.2 to about 0.7 is preferred.

Concerning the liquefier in the practice of the invention, there are no relevant limitations except that the liquefier should be able to provide a foam which is stable under ambient conditions on standing to allow for incorporation into a gypsum/water mixture and application of the mixture on a two dimensional substrate. Suitable liquefier for this purpose are e.g. liquefiers selected from the group comprising lignosulfonate salts, in particular with alkali or alkaline earth metal ions, naphthalenesulfonates, melamine resins, polycarboxylates, polycarboxylate esters and mixtures thereof. A particularly preferred liquefier is naphthalenesulfonate.

Technical grade liquefiers are regularly sufficient for the purposes of the invention. Since such liquefiers often contain water, the liquefier in the practice of the invention is allowed to comprise a limited amount of water, provided that the water content is less than 85 wt.-%. A water content of equal to or less than 80 wt.-% and/or 40 wt.-% or more is preferred, a particularly preferred water content is from about 55 to 60 wt.-%. Most preferably, the liquefier should not contain more water than is contained in the liquefier as commercially obtained.

As indicated above, the amount of liquefier in the inventive method should be adjusted such that a suitable flowability of the gypsum/water mixture is obtained, but that on the other hand the amount of liquefier is kept at a minimum to avoid costs and deterioration of the drying characteristics of the gypsum board. As a suitable amount to meet these requirements, a liquefier amount of 0.05 to 2.5 wt.-%, preferably 0.1 to 2 wt.-%, and more preferably 0.15 to 0.5 wt.-% based on the weight of the stucco, can be mentioned.

The foaming of the liquefier with a gas can be accomplished with any conventional foaming equipment, which has feed supply for gas. Particularly preferred foaming devices include stick mixers, which can be operated at high rotation speeds and which can induce high shearing in the liquefier to be foamed.

The foam thus produced and used in the further method of the invention preferably has a liquefier density of 30 to 80%, preferably 40 to 65%, relative to the density of the non-foamed liquefier. In other words, the foam includes an amount of gas, which accounts for 70 to 20 vol.-% and preferably 60 to 35 vol.-% of the liquefier foam. A preferred gas for the production of the foam is air, albeit other gases such as in particular inert gases such as nitrogen can likewise be used for the preparation of the foamed liquefier in the practice of the invention.

The incorporation of the liquefier foam, as indicate above, is possible at various stages of the preparation of the gypsum/water mixture. In one alternative, it is e.g. possible to add the foamed liquefier to the make water of the gypsum/water mixture, i.e. to the water, to which the gypsum and possible other solid constituents of the gypsum board is added. This alternative has the advantage, that it only requires a minimum of adaptations to the standard process of preparing gypsum boards.

In a second alternative, the foamed liquefier can be incorporated into the gypsum/water mixture by addition to the solid constituents thereof prior to mixing with water. In a third alternative, foamed liquefier can be incorporated into the gypsum/water mixture after it is formed in the mixer, e.g. in particular via a feed line in front of the dispensing device for application of the gypsum/water mixture onto the two dimensional substrate. In alternative thereto, if e.g. a mixing device is used for the preparation of the gypsum/water mixture, which has an outlet for the gypsum/water mixture at the tangential side thereof and has a slurry delivery conduit attached thereto, wherein the gypsum/water mixture is further mixed via a rotating motion (as e.g. disclosed in EP 1 637 302 B1), it is possible to direct the foamed liquefier into this slurry delivery conduit via an appropriate feed line. The second and third alternatives have the advantage that the improvement of flowability is higher (i.e. the same amount of liquefier provides for a higher flowability than in a process according to the first alternative).

As indicated above, the key finding of the application is that the introduction of a foamed liquefier into a gypsum/water mixture provides for a possible reduction in the amount of liquefier, which is used to prepare the gypsum board. While this does not exclude that also some liquefier is introduced into the gypsum/water mixture as a non-foamed liquefier, this reduces the advantage provided by the invention. Thus, in the practice of the invention, it is preferred that at least 60 wt.-%, more preferably at least 80 wt.-%, even more preferably at least 90 wt.-%, even more preferably at least 95 wt.-%, and most preferably all liquefier introduced into the gypsum/water mixture is introduced therein as a foam. The term "introduced" covers any embodiment, wherein the foam is mixed with any of the ingredients of the gypsum/water mixture to be formed or mixed with the gypsum/water mixture after it has been generated from the water and gypsum main ingredients.

For the production of light weight gypsum boards, it is conventional that a foam composed of a soap or surfactant and water is introduced into the gypsum/water mixture prior to the application or "pouring" thereof onto the two dimensional substrate. Thus, in the inventive method it is preferred that a further soap based foam is incorporated into a gypsum/water mixture prior to the application or "pouring" thereof onto the two dimensional substrate.

With regard to this foam, it is noted that this soap or surfactant foam is regularly water based, i.e. it is generated by foaming a mixture of water and the soap or surfactant to provide the foam wherein the water accounts for the major part of the mixture. E.g., the ratio of water to soap or surfactant in such mixtures is regularly at least 5:1, preferably at least 9:1 and more preferably at least 15:1. Suitable soaps/surfactants include e.g. alkali metal and/or ammonium salts of ethoxylated, sulfated alcohols as foaming agents such as those described in U.S. Pat. No. 5,683,635.

If a soap/surfactant based foam is incorporated into the gypsum/water mixture in the inventive method, it is preferred that the soap/surfactant based foam and the liquefier based foam are prepared independently from each other, i.e. that the soap/surfactant and the liquefier is not mixed with water to therefor generate the foam, but that the liquefier foam is prepared in a device separate from the soap/surfactant based foam. In this regard it is preferred that no significant quantity (i.e. less than 5 wt.-%) of the entire liquefier to be incorporated into the gypsum board is foamed together with the soap/surfactant water mixture.

As concerns the two dimensional substrate, to which the gypsum/water mixture is applied, any material can be used with is conventional in the preparation of gypsum boards, and which is in particular sufficiently flexible such that it can be bend without greater difficulty. Preferably, the two dimensional substrate is or comprises cardboard or a non-woven. In addition, in the inventive method it is preferred that the mixture is covered after the application with a further substrate, which may be constituted from the same material which forms the two dimensional substrate or a different material. Preferably, the two dimensional substrate and the further substrate are from or comprise the same material, e.g. cardboard. In the resulting gypsum board, the gypsum containing layer is sandwiched between the two substrate layers thus forming a core layer.

A "two dimensional substrate" is a substrate with extends principally in two room dimensions and has a thickness, which is significantly less than the length and width of the material.

The physical characteristics of the gypsum board can be modified and adjusted by the addition of one or more of accelerators, fibers and other conventional additives.

A suitable accelerator is e.g. calcium sulfate dihydrate or potassium sulfate.

Fibers can be incorporated in the gypsum/water mixture to improve the stiffness of the resulting gypsum boards. A preferred type of fiber for this purpose are glass fibers, which can suitably be added to the mixture. Another preferred type of fibers are paper fibers.

Conventional additives, which may be used in the method of the invention, include modifiers such as e.g. cement, lime, quicklime or calcium oxide, slaked lime, also known as calcium hydroxide, soda ash, also known a sodium carbonate, potassium carbonate, also known as potash, and other carbonates, silicates, phosphonates and phosphates.

Further additives, which may be used in the practice of the invention include starches (e.g. to increase the paper bond and strengthen the product), wax emulsions of siloxanes (e.g. to improve the water-resistence of the finished gypsum board), trimetaphosphate compounds (to enhance the strength of the product and to improve sag resistance of the set gypsum), set retarders, flame retarders and biocides (to reduce growth of mold, mildew or fungi).

Examples of suitable biocides include boric acid, pyrithione salts and copper salts; biocides may suitably be incorporated into either the two dimensional substrate or the gypsum core layer.

Examples of suitable starches include in particular pregelatinized starches or acid-modified starches. The inclusion of the pregelatinized starch increases the strength of the set and dried gypsum cast and minimizes or avoids the risk of paper delamination under conditions of increased moisture.

Also, sugars such as dextrose can be added to improve the paper bond at the ends of the gypsum boards, or boric acid can be added to increase stiffness.

In the inventive process, it is furthermore preferred that the liquefier is foamed in a device, which is spatially separated from the device in which the foamed liquefier is introduced into the gypsum/water mixture. I.e. the device for foaming the liquefier is not part of the same device, wherein the gypsum/water mixture is prepared, but is separate therefrom. The foamed liquefier in this case is transferred to this device via an appropriate line.

As conventional in methods to prepare gypsum boards, the inventive methods may contain further steps including the shaping of the gypsum/water mixture into an endless ribbon or strip and allowing the gypsum/water mixture to set. The ribbon or strip can be cut to obtain a gypsum board of the desired dimensions.

In a second aspect, the invention concerns a gypsum/water mixture or gypsum board obtainable according to a method as described above.

In a third aspect, the invention concerns an apparatus for producing a gypsum board, preferably for implementing a method as described hereinabove, wherein said apparatus comprises a foaming device, a mixer for producing a gypsum/water mixture, and, fluidly coupled thereto, an output device for dispensing a gypsum/water mixture prepared in the mixer on a two dimensional substrate, wherein the foaming device is fluidly coupled to a supply line of water to the mixer, a supply line for solid constituents of the gypsum board to be formed or with a discharge device of the mixed material from the mixer in front of the output device.

In a preferred embodiment of the apparatus, the apparatus comprises two separate foaming devices wherein the first of these is adapted to prepare a foam from a water and soap/surfactant mixture, and wherein the second foaming device is adapted to prepare a foam of a liquefier. In this case, the foaming device, which is adapted to prepare a foam from a water and soap/surfactant mixture, is preferably fluidly coupled to the apparatus via a supply line to a position between the mixer and the output device. The second foaming device is preferably also fluidly coupled to a position between the mixer and the output device or is fluidly coupled to the feed line for solid materials into the mixer.

The mixer in the inventive apparatus preferably has an outlet for the gypsum/water mixture at the tangential side thereof and has a slurry delivery conduit attached thereto, which is configured such that a gypsum/water mixture introduced thereto is provided with a rotating motion and thus further mixed; corresponding mixing devices are e.g. disclosed in EP 1 637 302 B1. If the mixer has such configuration, it is further preferred that the foaming device, which is adapted to foam the liquefier, is fluidly connected to the slurry delivery conduit via a supply line. In a particularly preferred embodiment at least this supply line is filed at least in part with a foamed liquefier having a water content of less than 85 wt.-%.

In a fourth aspect, the invention concerns the use of a liquefier foam having a water content of less than 85 wt.-% to minimize the amount of liquefier required to establish a desired flowability of a gypsum/water mixture, wherein the foamed liquefier is mixed into the gypsum/water mixture either as constituent used to prepare the mixture or after the mixture has formed.

In the above, any embodiments, which have been indicated as preferred in connection with the inventive methods, are also preferred embodiments of the inventive products, apparatus and use unless they are in clear contradiction thereto.

BRIEF DESCRIPTION OF THE DRAWINGS

To further illustrate the invention, reference is made to the attached FIGS. 1 and 2.

In FIGS. 1 and 2 gypsum, water, accelerator and optional additives are mixed in the mixer 1.

DESCRIPTION OF THE INVENTION

Figure 1:
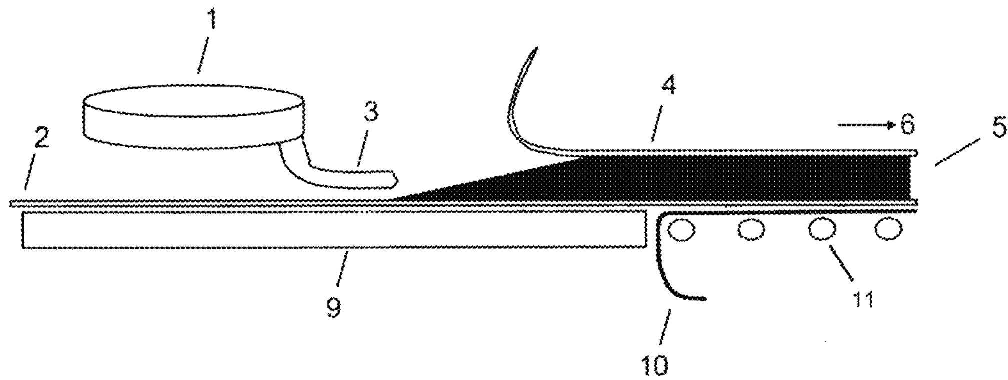
FIG. 1 illustrates an embodiment of a standard process to prepare gypsum boards with a forming station and molding channel 9, a setting belt 10 and a roller conveyor 11. In this process, all constituents of the gypsum board including the liquefier, which may have been mixed into the process water, are mixed in the mixer 1 and applied to a substrate 2 such as cardboard via the discharge device 3. Soap/surfactant foam can be added separately (not shown). Subsequently, the applied mixture forms a flat core and a further layer of substrate (e.g. cardboard) 4 is applied thereon. Finally, the sandwich construct 5 is cut and is conveyed further to a dryer 6.
Figure 2:
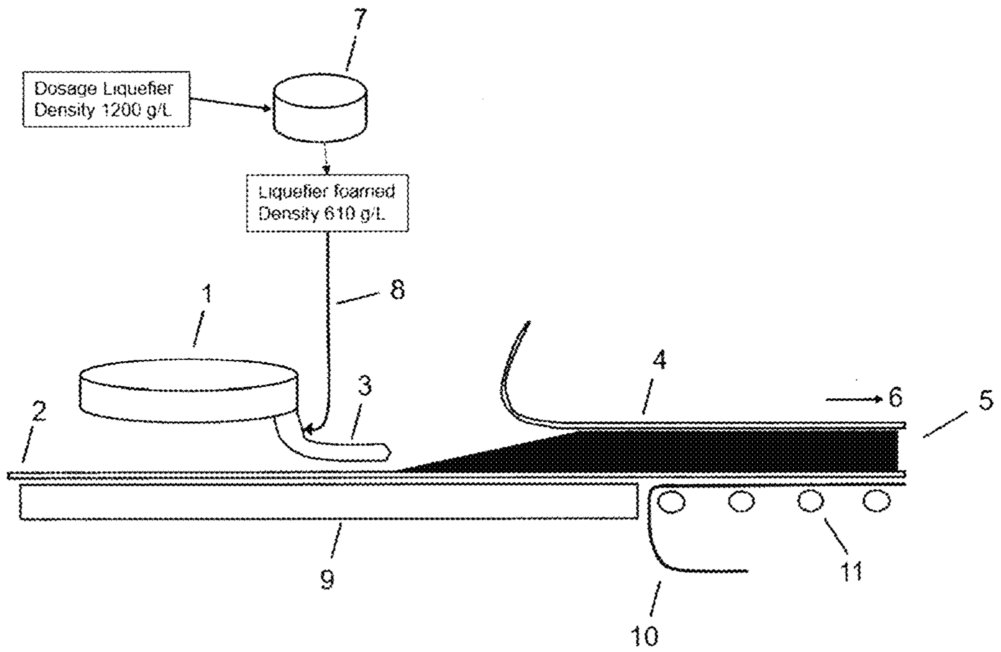
FIG. 2 illustrates an embodiment of an inventive process. In this process, the liquefier is pre-processed to a foam in a foaming device 7 and then introduced to the gypsum board preparation device between the gypsum/water mixer 1 and the discharge device 3 via line 8. Alternatively, the foamed liquefier can also be applied into the feed line for water into the mixer 1 or into the feed line for solid constituents of the gypsum board into the mixer 1.

In the following, the invention will be further illustrated by means the examples, which should however not be construed as in any way limiting to the invention.

EXAMPLES

Example 1

Naphthalenesulfonate (density 1.2 kg/L) was used as the liquefier. A foam of the liquefier was produced by subjecting the naphthalenesulfonate to mixing at 4200 U/min to provide a foam having a stability of between 5 and 30 min (i.e. in this time at most 10% of the liquid initially used may separate). The thus generated foam had a density of about 610 g/L.

The foamed naphthalenesulfonate was subsequently used for the preparation of gypsum boards prepared from 400 g stucco, 276 g water, 1 g accelerator (calcium sulfate dihydrate) and 2 g/1 g liquefier (0.50/0.25 wt.-% on stucco) as follows:

Water, stucco, accelerator and liquefier were mixed in a KitchenAid mixer by introducing the stucco/accelerator premix into the water for 10 sec and mixing for 7 sec at full throttle. In samples 1 and 2, the foamed liquefier was added to the water prior to introduction of the stucco/accelerator premix. In samples 3 and 4 the foamed liquefier was added to the stucco/accelerator premix prior to introduction thereof into the water. In sample 5 and 6 half the amount of liquefier (1.0 g, 0.25 wt.-%) compared to samples 3 and 4 was used. For comparison, a further sample without liquefier (comp. 1) was tested.

The samples were subjected to slump flow testing as follows: A stucco slurry was prepared as indicated above. After the mixing at full throttle, the slurry was transferred into a testing cone (with a 5 cm height and 10 cm width ring) within 13 sec, and excess slurry was removed with a spatula. Then, after a total time of 30 sec, the ring was lifted from the surface, and the slump flow was determined as the largest dimension of the stucco mixture spread on the surface after the flowing of the mixture has stopped. The results of these tests are provided in the below table 1:

TABLE 1

| Sample | Liquefier (non-foamed, 1200 g/L) | Liquefier (foamed, 610 g/L) | added | Slump flow [mm] |
|---|---|---|---|---|
| comp. 1 | 0 | 0 | — | 197 |
| 1 | 2.0 | | To the water | 240 |
| 2 | | 2.0 | To the water | 249 |
| 3 | 2.0 | | To the gypsum mass | 235 |
| 4 | | 2.0 | To the gypsum mass | 255 |
| 5 | 1.0 | | To the gypsum mass | 213 |
| 6 | | 1.0 | To the gypsum mass | 222 |

As is apparent from the above, a strong effect on the slump flow can be seen when the foamed liquefier is added to the gypsum mass prior to mixing (samples 3 to 6). However, also when the liquefier was added to the water, the slump flow is improved relative to the sample, which was prepared using a non-foamed liquefier.

Example 2

To determine the quantity for the effect of slump flow two samples using a non-foamed liquefier (samples 7 and 8) and two samples using a foamed liquefier (samples 9 and 10) were measured. The tests were performed as indicated above with a composition of 400 g stucco, 276 g water, 5.2 g calcium sulfate dihydrate (accelerator), 0.044 g retarder and 1.88 g liquefier. For samples 9 and 10 the foamed liquefier was added to the dry gypsum mixture. For sample 11, the amount of liquefier was reduced by about 10% to 1.68 g. The results of these tests is indicated in the below table 2:

TABLE 2

| Sample | Addition of liquefier | Density [g/L] | Slump flow [mm] |
|---|---|---|---|
| 7 | Pure, non-foamed | 1200 | 242 |
| 8 | Pure, non-foamed | 1200 | 240 |
| 9 | foamed | 650 | 260 |
| 10 | foamed | 675 | 259 |
| 11 | foamed | 720 | 245 |

As is apparent from the above, the effectivity of the foamed liquefier is increased by about 8 to 9% relative to the non-foamed liquefier. In addition, sample 11 shows that about the same slump flow can be obtained with a foamed liquefier, whose content has been reduced by about 10%.

Example 3

To determine whether the improved effectivity of the liquefier is an effect resulting from better homogenization of the liquefier, a comparison of a foamed liquefier (sample 13) and a liquefier, which was mixed/homogenized with water, but not foamed (sample 14), was made (for comparison, also sample 12 is provided, which uses a non-foamed liquefier). The compositions of the test samples were the same as in example 2 (i.e. 1.88 g liquefier on 400 g stucco). The results of this test are provided in the below table 3.

TABLE 3

| Sample | Addition of liquefier | Density [g/L] | Slump flow [mm] |
|---|---|---|---|
| 12 | Pure, non-foamed | 1200 | 237 |
| 13 | foamed | 630 | 253 |
| 14 | mixed/homogenized with water | 1200 | 233 |

Table 3 shows that mixing/homogenizing the liquefier with water has no significant impact on the slump flow, relative to the non-foamed sample. In contrast, if the liquefier is foamed, the slump flow is significantly increased.

LIST OF REFERENCE SIGNS

1 mixer
2 substrate
3 discharge device
4 second substrate
5 sandwich construct (gypsum board)
6 dryer
7 foaming device
8 line for feeding liquefier foam
9 forming station and molding cannel

10 setting belt

11 roller conveyor

The invention claimed is:

1. A method for producing a gypsum board from a gypsum/water mixture, wherein a liquefier for the gypsum/water mixture is foamed with a gas to provide a foam, the liquefier including water in the liquefier and water added during foaming has an overall water content of less than 85 wt.-%, then incorporated into the gypsum/water mixture and the mixture thus obtained is applied on a two dimensional substrate.

2. The method of claim 1, wherein the liquefier is foamed with the gas such that it has a density of 30 to 80% relative to the density of the non-foamed liquefier.

3. The method of claim 2, wherein the liquefier is foamed with the gas such that it has a density of 40 to 65% relative to the density of the non-foamed liquefier.

4. The method of claim 1, wherein the foamed liquefier is incorporated into the gypsum/water mixture by addition to the solid constituents thereof prior to mixing with water or to the gypsum/water mixture after it is formed in a mixer.

5. The method of claim 4, the foamed liquefier is incorporated into the gypsum/water mixture after it is formed in a mixer via feed line in front of a dispensing device for application to the two-dimensional substrate.

6. The method of claim 1, wherein the foamed liquefier is added to the water which is used to prepare the gypsum/water mixture.

7. The method of claim 1, wherein at least 60 wt.-% of the liquefier is incorporated into the gypsum/water mixture as a foam.

8. The method of claim 7, wherein at least 80 wt.-% of the liquefier is incorporated into the gypsum/water mixture as a foam.

9. The method of claim 1, wherein a further soap based foam is incorporated into the gypsum/water mixture.

10. The method of claim 9, wherein the soap based foam and the foamed liquefier are generated independently from each other.

11. The method of claim 1, wherein the two dimensional substrate to which the mixture is applied comprises cardboard or a nonwoven, and wherein the mixture is optionally covered after the application with a further substrate, which may be constituted from the same material which forms the two dimensional substrate or a different material.

12. The method of claim 1, wherein the liquefier is selected from the group comprising lignosulfonate salts, naphthalenesulfonates, melamine resins, polycarboxylates, polycarboxylate esters and mixtures thereof.

13. The method of claim 1, wherein the liquefier is included in a proportion of 0.1 to 2.5 wt.-% based on the weight of the stucco, in the gypsum/water mixture.

14. The method of claim 13, wherein the liquefier is included in a proportion of 1 to 2 wt.-% based on the weight of stucco in the gypsum/water mixture.

15. The method of claim 1, further comprising incorporating one or more of accelerators, fibers, and additives into the gypsum/water mixture.

16. The method of claim 15, wherein the fibers comprise glass fibers.

17. The method of claim 1, wherein the liquefier is foamed in a device which is spatially separated from a device in which the foamed liquefier is introduced into the gypsum/water mixture.

18. A gypsum board produced according to a method as described in claim 1.

19. An apparatus for producing a gypsum board, according to the method as described in claim 1, said apparatus comprising two separate foaming devices, a mixer for producing a gypsum/water mixture, and an output device for dispensing the gypsum/water mixture prepared in the mixer on a two dimensional substrate, wherein a first foaming device is configured to prepare a foam from a water and soap or surfactant soap or surfactant mixture, and a second foaming device is configured to prepare a foam of a liquefier, wherein the second foaming device is fluidly coupled to a supply line of water to the mixer, a supply line for solid constituents of the gypsum board to be formed or with a discharge device of the mixed material from the mixer in front of the output device.

* * * * *